F. HACHMANN.
PISTON RING.
APPLICATION FILED DEC. 13, 1919.
1,367,136.
Patented Feb. 1, 1921.
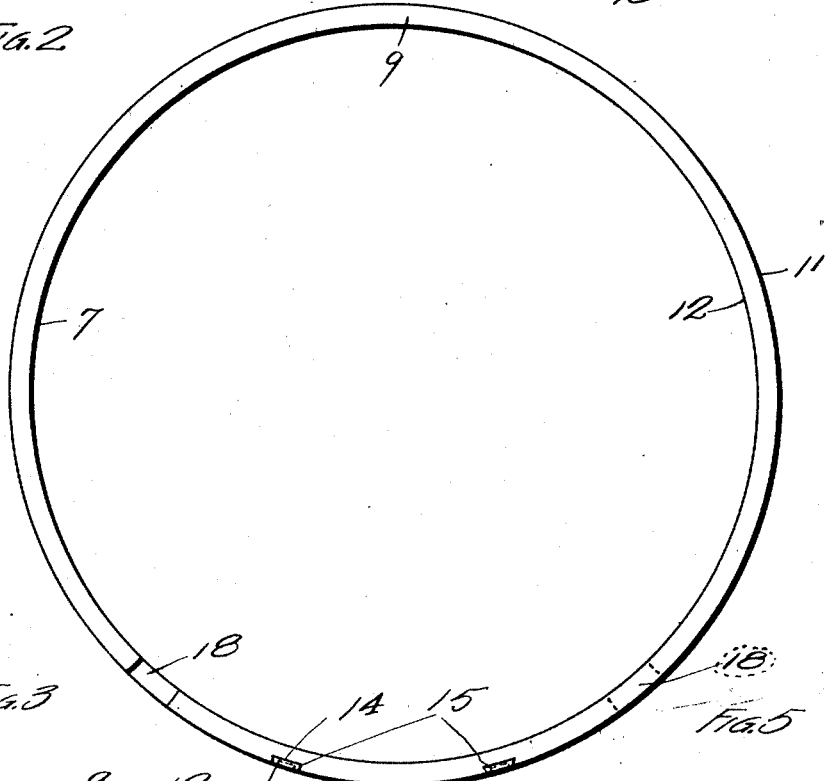

UNITED STATES PATENT OFFICE.

FREDERICK HACHMANN, OF ST. LOUIS, MISSOURI, ASSIGNOR OF ONE-FOURTH TO DAVID M. HUTCHINSON, OF FERGUSON, MISSOURI, AND THREE-EIGHTHS TO HERMAN C. STIFEL, OF ST. LOUIS, MISSOURI.

PISTON-RING.

1,367,136.     Specification of Letters Patent.     Patented Feb. 1, 1921.

Application filed December 13, 1919. Serial No. 344,623.

*To all whom it may concern:*

Be it known that I, FREDERICK HACHMANN, a citizen of the United States, and a resident of the city of St. Louis and State of Missouri, have invented certain new and useful Improvements in Piston-Rings, of which the following is a specification containing a full, clear, and exact description, reference being had to the accompanying drawings, forming a part thereof.

My invention relates to improvements in piston rings, and has for its primary object a piston ring composed of two split complementary sections, the sections being held together by dovetailed rivets fitted in their outer surface.

A further object is to construct a piston ring of two complementary sections so that the same can be formed of a sleeve of spring material such as cast iron or the like, and which after being turned and bored is provided with a pair of dovetailed slits cut in the outer periphery and then cut into small pieces so as to form complementary sections of a piston ring in conjunction with a dovetailed rivet formed of softer material than the complementary sections of the ring, so that when the rivets are secured in place to join the two sections of the ring they will not score the cylinder bore, while still at the same time holding the sections of the ring firmly together but allowing the usual expansion necessary in a piston ring.

In the drawings:

Figure 1 is a side elevation of my device.

Fig. 2 a top view of the same.

Fig. 3 an enlarged fragmentary portion of one of the rings showing the dovetailed recess.

Fig. 4 an enlarged view of the rivet made use of.

Fig. 5 a fragmentary perspective view of one of the rivets showing the end upset, and Fig. 6 a side view of one of the rivets with a portion thereof in section and showing the same after it has been upset or clenched.

In the construction of my device I provide a piston ring which is composed of two complementary sections 7 and 8, these sections being finished so as to have their faces 9 and 10 parallel to each other, the faces 11 and 12 being turned. In the faces 11 are formed dovetailed grooves 13, and in the faces 9 of the sections 7 and 8 I form enlargements 14 which are of the same shape as the dovetailed grooves 13 and are adapted to receive shoulders or upset portions 15 formed on the dovetailed rivet 16. This rivet is preferably constructed of brass or some other material which is softer than that of which the piston ring proper is composed, and the rivet is made long enough so that it will in its initial state project slightly beyond the surfaces 9 of the complementary sections of the ring. After being inserted, the ends 17 are riveted over so as to form the shoulders 15, see Figs. 5 and 6, and thus securely bind both sections of the ring together. As shown in Figs. 1 and 2, the slotted portions 18 of the complementary sections are placed one on each side of the two rivets or binding members. This allows full expansion of the piston ring and makes it virtually a one piece ring which possesses all the advantages of a two piece ring.

After the complementary sections have been secured together the ring is sprung into closed position and finished by grinding or by any of the other well known means of finishing piston rings.

By the construction of my device it is possible to construct two piece piston rings out of sleeves of cast iron and turn the sleeves inside out, then cut the two dovetailed grooves in the sleeve, then slit it, and after this operation divide each sleeve into the piston ring portions, in other words, it will take two complete cast iron sleeves finished, dovetailed and slitted and divide it into portions to make a complete set of piston rings, it being necessary to take one section of one sleeve and one section of another sleeve to form a complete ring, as the slitted portions of each complete ring are formed on opposite sides of the dovetails cut in the periphery of the ring.

The object in forming the recess 14 adjacent the dovetail cut in the faces of the ring and only on one side thereof is to allow for the upsetting of the rivet so that when the sections of the ring are secured together and ground a smooth surface is made between the rivet, the upsetting ends thereof and the piston ring on the three sides where the same is visible or can contact with the piston.

Having fully described my invention, what I claim is:

1. A piston ring composed of two slit complementary sections, dovetailed grooves formed in each of the sections, and dovetailed rivets for securing the sections together.

2. A piston ring composed of two slit finished complementary sections superimposed on each other, dovetailed grooves formed in the outer periphery of each section, a recess formed in each dovetailed groove, said recess being located on the outer edges of the two sections when assembled, and a dovetailed rivet adapted to be inserted into the dovetailed groove and upset within the recesses, said rivet adapted to hold the sections of the ring against separation in all directions.

3. A piston ring composed of two complementary sections, said sections being split so as to allow for compression and expansion, and a pair of rivets for securing the sections together, said rivets being of softer material than the ring proper and being so located that three of their faces are exposed.

4. A piston ring composed of two slitted finished sections, the slit in one section being covered by the body portion of the other section, both sections having formed on their outer surfaces dovetailed grooves, the outer portion of each groove being provided with a recess, a metal rivet made of material softer than the material out of which the sections are formed located in said grooves and having its ends upset so as to completely fill in the recesses formed at the outer ends of said grooves, the upper and lower ends of said rivet being flush with the upper and lower faces of the completed ring and the sides of said ring being flush with the outside surfaces of said sections.

In testimony whereof I have signed my name to this specification.

FREDERICK HACHMANN.